Patented June 12, 1934

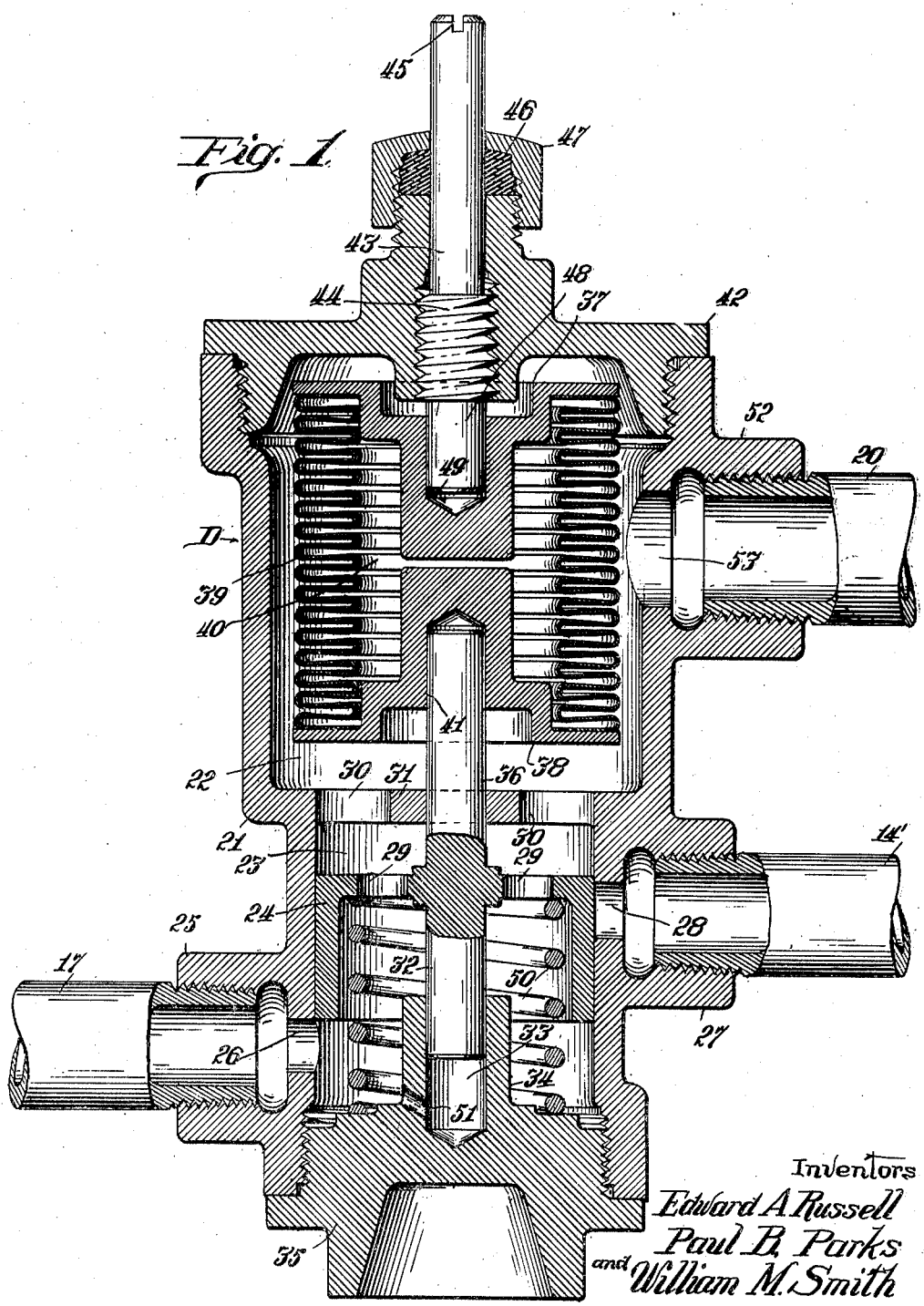

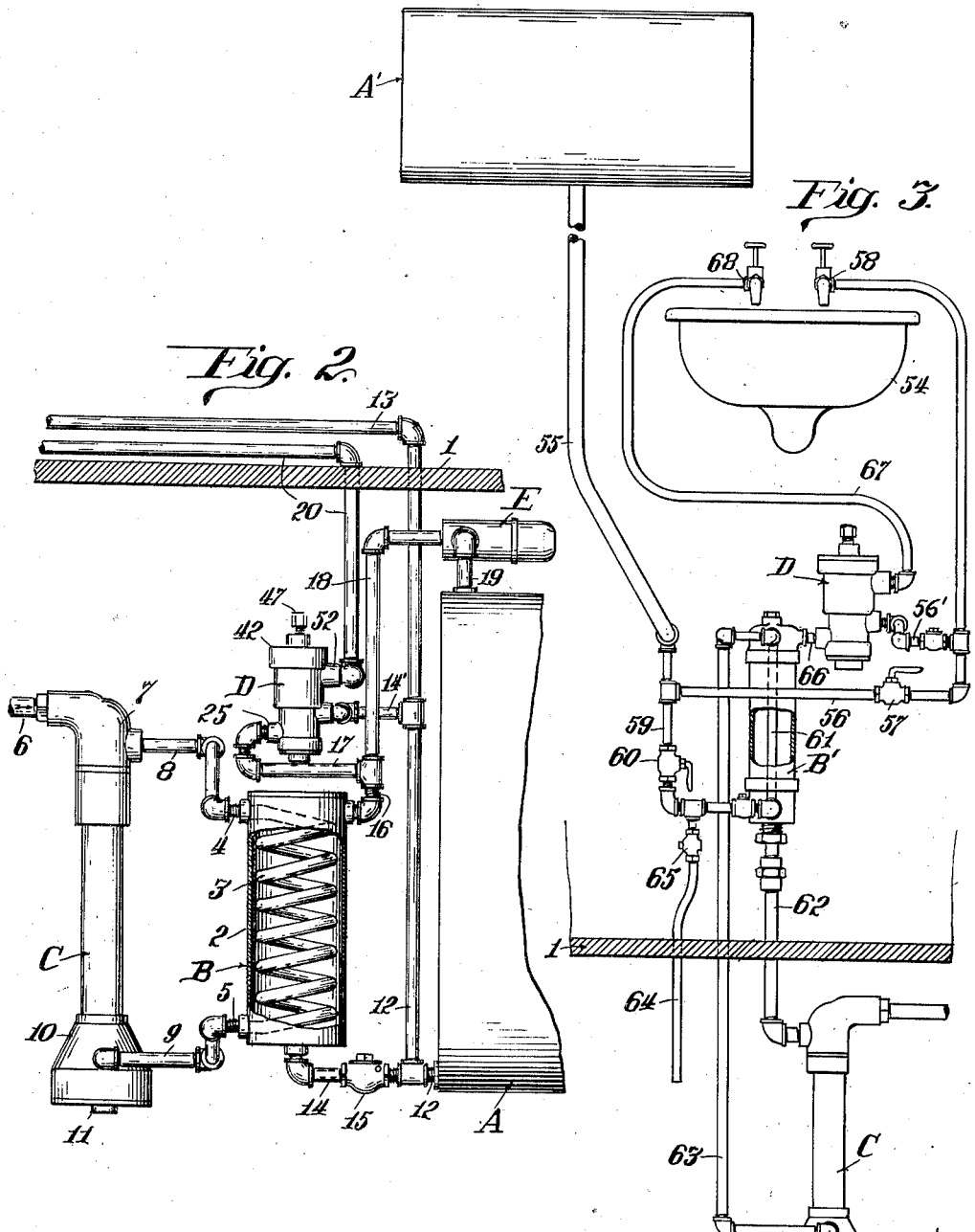

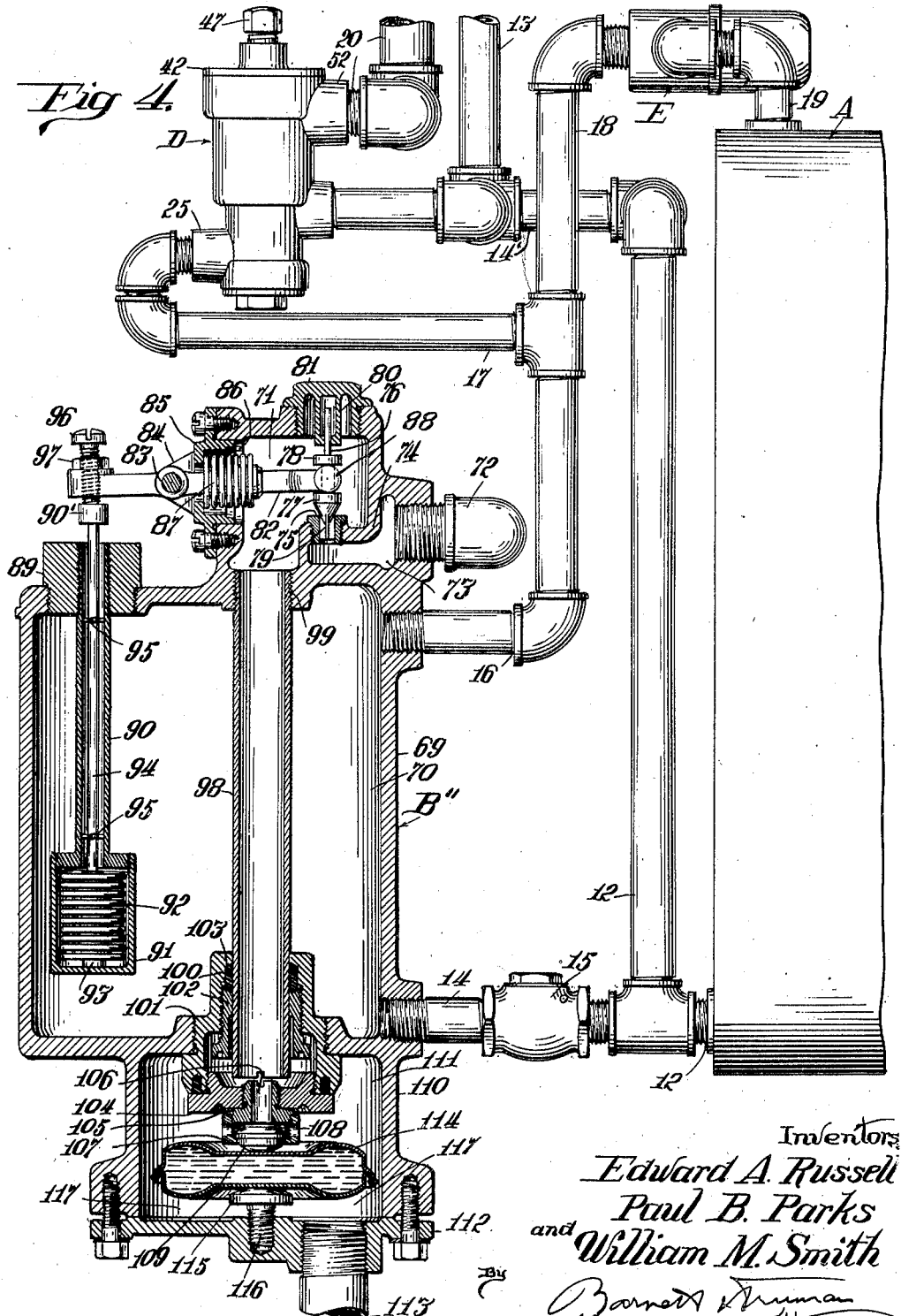

1,962,214

UNITED STATES PATENT OFFICE 1,962,214

HOT WATER TEMPERATURE REGULATOR

REISSUED

Edward A. Russell, Chicago, Paul B. Parks, Oak Park, and William M. Smith, Chicago, Ill., assignors to Vapor Car Heating Company, Inc., Chicago, Ill., a corporation of New York Application April 26, 1933, Serial No. 668,042

6 Claims. (Cl. 236—12)

This invention relates to certain new and useful improvements in a hot water temperature regulator, and more particularly to improved apparatus for furnishing hot water to the wash bowls or shower baths of a railway car at a substantially predetermined temperature, or for not letting the temperature of this water reach an undesirable maximum.

The water heaters commonly used in the washrooms of Pullman cars and similar railway cars include a steam heating coil or other heating element through which the heating medium flows, the water in its passage from the water supply tank to the wash basin or shower coming in contact with this heating element so that its temperature is raised. The heating tank through which this water flows is comparatively small and since the heating element is continuously in operation the water will be overheated when the hot water is not drawn upon for a considerable period of time. If a small enough heating element is used to avoid this over-heating, the water will not be sufficiently heated or will not be heated in sufficient quantities at such times as the washing apparatus is in substantially continuous service.

According to the present invention, a mixing valve is provided in the hot water line between the heating tank and the wash basin or other place of usage, this valve being adapted to automatically mix a required percentage of cold water with the hot water from the heating tank so that the water delivered to the wash basin will be at a substantially predetermined temperature. This permits the heating device to raise the temperature of the hot water supply above the temperature desired for use, and increases the hot water supply available at any time since the volume of this hot water is increased by the addition of cold water in the mixing valve before it is delivered for service. Also, injury to the user of the washing apparatus by contact with excessively heated water is prevented, without requiring any accurate control of the initial temperature to which the water is heated.

The principal object of this invention is to provide an improved wash water heating apparatus of the type briefly described hereinabove and disclosed more in detail in the specifications which follow.

Another object is to provide improved apparatus for supplying cold water and hot water at a predetermined temperature, from a single source of supply to the washing system on a railway car.

Another object is to provide, in combination with a mixing valve, a means for heating the water to a substantially predetermined temperature.

Other objects and advantages of this invention will be more apparent from the following detailed description of certain approved forms of apparatus designed and operating according to the principles of this invention.

In the accompanying drawings:

Fig. 1 is a vertical central section through the improved mixing valve.

Fig. 2 is an elevation, partially in vertical section, showing the principal elements of the combined apparatus for supplying wash water to a railway car washing system.

Fig. 3 is a view similar to Fig. 2 showing a modified form of the assembly.

Fig. 4 is a view showing a portion of the combination shown in Figs. 2 and 3, but provided with a different form of water heater adapted to heat the water to a substantially predetermined temperature.

Reference will first be made to Fig. 2 which shows the principal elements of an apparatus adapted to supply both hot and cold water in considerable quantities to a washing system or apparatus in a railway car, which may include a shower bath. Most of the elements of this apparatus are suitably positioned beneath the floor 1 of the railway car, the combination comprising the water reservoir A, the water heater B, a suitable vapor regulator C, the improved mixing valve D, and a pressure controlled blow-off valve E. The tank A may be of any desired or usual form and of sufficient capacity to hold the water supply for both the hot and cold water. Suitable pressure means are provided for forcing the water from tank A up into the car for delivery to the washing apparatus. The heating mechanism B comprises a closed tank 2 in which is positioned a heating coil 3 having an inlet end 4 and an outlet end 5 projecting through and sealed in the upper and lower portions respectively of the tank. The vapor regulator C may be of any well known type, and steam from the supply pipe 6 passes into the valve casing 7 at the upper end of the regulator from which vapor supply pipe 8 leads to the inlet end 4 of the heating coil 3. Pipe 9 leads from the outlet 5 of the heating coil into the chamber 10 of the vapor regulator in which is positioned the usual thermostatic element for controlling the steam supply valve in casing 7. As is usual in this type of apparatus, vapor will flow through pipe 8 to and through the coil 3 and then through pipe 9 into casing 10, whereupon the thermostatic element will expand and close the valve in casing 7 so as to cut off the further flow of vapor into the heating coil. As the vapor condenses, condensate will flow out through pipe 9 and an outlet 11 in the lower portion of casing 10, and as the vapor in casing 10 condenses the thermostatic element therein will cool and permit the valve in casing 7 to open and admit more vapor to the heating coil. All of this steam or vapor control mechanism is old and well known in the art. The capacity of the heating tank 2, and the heating capacity of coil 3, may be such that a desired supply of water may be heated to a temperature considerably in excess of the temperature desired for use. For example, the water in tank 2 may be heated (when the supply is not being drawn upon) to approximately 200° Fahrenheit whereas the water supplied for use in the washing system should not exceed, for example, 120° Fahrenheit.

The purpose of the improved mixing valve D (which will be hereinafter described in detail) is to mix a necessary percentage of cold water with the hot water supplied from tank 2 so that the water delivered to the washing apparatus will be at substantially the desired temperature.

The cold water supply pipe 12 leading from the lower portion of reservoir A has a main branch 13 leading directly upward to the wash basin or shower within the car or other place of usage. A second branch 14 extends from supply pipe 12 into the lower portion of the heating tank 2. A one-way valve 15 is positioned in this branch 14 to prevent the return of heated water from the apparatus B into the cold water side of the apparatus. A third branch 14' leads from pipe 12 into the mixing valve D. A hot water pipe 16 leads from the upper portion of tank 2 and has a main branch 17 leading into the mixing valve D. A second branch 18 leads to the pressure control valve E from which a pipe 19 leads into the upper portion of reservoir A. The valve E may be a pressure controlled safety valve of any well known type. It contains a valve which is normally closed and cuts off communication between pipes 18 and 19. If the pressure in tank 2 and pipe 18 should exceed a predetermined maximum, due to the generation of steam or other causes, the safety valve E will open and permit the excess pressure to blow off through pipes 18 and 19 back into the reservoir A. Pipe 20 leads from mixing valve D up through the floor 1 of the car, usually adjacent the cold water pipe 13, to supply hot water at the desired temperature to the washing apparatus within the car.

The improved mixing valve D will now be described, referring more particularly to Fig. 1. The main casting or casing 21 encloses the mixing chamber 22 with which communicates the downwardly projecting valve passage 23 which is of uniform cross section, preferably cylindrical. A slide or sleeve valve 24 is movably fitted within this passage 23. The hot water supply pipe 17 is connected into a nipple 25 formed at one side of casing 21, and communicates with an inlet port 26 extending into the lower portion of valve passage 23. The cold water supply pipe 14' is connected to a nipple 27 at one side of casing 21 and communicates through inlet port 28 with the valve passage 23. Inlet port 28 is positioned at a different elevation from inlet port 26 so that with the slide valve 24 in the position shown in Fig. 1, the cold water inlet port 28 will be closed by this slide valve but the hot water inlet port 26 will be open and admit hot water into the passage 23 beneath the slide valve. The hot water will flow through suitable openings 29 in the movable valve member, and through openings 30 at either side of the guide web 31 up into the mixing chamber 22. If the valve member 24 is moved downwardly, the hot water inlet port 26 will be closed and the cold water inlet port 28 will be opened. This closing of one valve and opening of the other as the slide valve is moved will be progressive so that any desired percentage of hot and cold water may be obtained, the supply from both sources flowing up into mixing chamber 22. A central guide stem 32 projects downwardly from the movable valve member 24 into a guide passage 33 formed in a boss 34 projecting upwardly from the plug 35 which is screwed into and closes the lower end of casing 21. An operating stem 36 projects upwardly from the movable valve member 24 through a guide opening in web 31 into the mixing chamber 22.

A thermostatic element positioned in mixing chamber 22 preferably comprises a pair of similar upper and lower plates or headers 37 and 38 which are connected by a tubular corrugated bellows structure 39 so as to enclose a chamber 40 of variable volume in which is housed a quantity of suitable heat responsive fluid which expands and contracts readily in response to temperature changes. The operating stem 36 for valve member 24 projects upwardly into and fits within a suitable opening 41 provided in the lower header 38 of the thermostatic element. A cap 42 is screwed into and closes the upper end of the casing 21. A post 43 mounted in and extending vertically through the cap 42 has a threaded portion 44 engaging in a correspondingly threaded opening in the cap so that the position of the post may be vertically adjusted. In the example here shown the upper end of post 43 is slotted at 45 to receive a tool for making this adjustment. The passage about the post 43 is sealed by a suitable packing 46 held in place by cap 47. The lower end portion 48 of post 43 extends into a suitable opening 49 formed in the upper header 37 of the thermostatic element, thus centering and supporting the thermostatic element within the mixing chamber 22 and forming an abutment for limiting the upward movement of the thermostatic element. It will be apparent that since upward movement of the header 37 is prevented by the abutment post 43, when the thermostatic element expands the lower header 38 will be forced to move downwardly, thus through stem 36 forcing the slide valve 24 downwardly against the opposition of a compression spring 50 which is confined within the lower portion of valve passage 23 between the slide valve 24 and closure plug 35. As the thermostatic element contracts, the spring 50 will expand and move the slide valve upwardly. A passage 51 connects the lower portion of guide passage 33 with the surrounding valve passage 23 thus permitting the fluid pressures within passages 23 and 33 to equalize as the guide stem 32 is moved up and down. The discharge pipe 20 for the hot wash water is connected into a nipple 52 at one side of casing 21 and communicates with the outlet port 53 leading from mixing chamber 22.

In the operation of this mixing valve, assuming that the temperature of the hot water supplied through pipe 17 is not higher than the desired temperature of the wash water to be supplied through pipe 20, the thermostatic element will contract to the position shown in Fig. 1 and slide valve 24 will be moved upwardly so as to close the cold water port 28. Hot water will now flow in from the heater B through pipe 17, to and through the various passages in the mixing valve and out through discharge pipe 20. If the temperature of the water supplied from the heater through pipe 17 exceeds the desired outlet temperature, the thermostatic element will expand so as to move the slide valve 24 downwardly to a desired extent, thus partially closing the hot water inlet port 26 and partially opening the cold water inlet port 28 so that the necessary percentage of cold water will be admitted and mixed with the hot water in chamber 22 to lower the temperature of the mixture discharged through outlet pipe 53 to the temperature desired for use. It will be apparent that the vertical positioning of the thermostatic element within the mixing chamber may be adjusted bodily by adjusting the abutment post 43 up or down, thus changing the effective temperature at which the slide valve 24 will be moved to progressively open or close the hot and cold water inlet openings. In this way the temperature of the water discharged through pipe 20 may be adjusted within certain limits and maintained substantially constant at approximately a desired temperature.

Referring now to the general operation of the assembly as shown in Fig. 2, it will be noted that the operation of this water supply system is entirely automatic, the flow of hot and cold water through the system depending entirely on the opening and closing of the discharge valves or faucets with which the supply pipes 13 and 20 connect within the car. Steam or vapor is automatically supplied to fill the heating coil 3, and the water within tank 2 will be heated by this coil to a temperature which may or may not be considerably in excess of the temperature desired for use, depending upon the rate at which water is withdrawn from the heating tank. This water will not ordinarily be heated to the point that steam pressure will be developed within the tank, but in case this should happen, the excess pressure can blow off through pipes 18 and 19 and safety valve E back into the reservoir A. Cold water is automatically supplied as required from reservoir A through pipe 12 and its branches 13, 14 and 14', to the cold water discharge faucet, the heating tank 2, and the mixing valve D, respectively. The requisite proportions of hot and cold water are supplied to mixing valve D through pipes 14' and 17 so that the wash water discharged through pipe 20 will be at approximately the desired temperature.

A somewhat modified form of the apparatus, which operates substantially in the same manner as the form first described, is illustrated in Fig. 3. In this type of apparatus the vapor regulator C is positioned as usual beneath the car, but the heating tank B' and the mixing valve D are positioned within the car compartment, usually below or adjacent the basin 54 to be supplied with wash water. The reservoir or tank A' is positioned overhead so as to provide a gravity head of water through pipe 55 to the hot and cold water supply systems. Branch pipe 56 provided with normally open cut-off valve 57 leads from pipe 53 up to the cold water faucet 58. Another branch 59 leads through normal open cut-off valve 60 into the lower portion of heating tank B'. In the form here shown, this heating tank is smaller and of somewhat simpler construction than the heater B previously described, consisting simply of an outer tank or casing through which extends a vertical heating pipe or conduit 61 through which the steam or vapor flows. As in the first described heating system, steam from the steam supply pipe 6 flows through pipe 62 and heating conduit 61 and back through pipe 63 to the vapor regulator C. A drain pipe 64 also extends downwardly from the supply pipe 59 through the floor 1 of the car so that the hot water side of the system may be drained out if desired by closing cut-off valve 60 and opening the valve 65 in this drain pipe. The hot water supply pipe 66 leads from the upper end of heating tank C' into the mixing valve D, and a branch 56' of the cold water pipe 56 also extends into this mixing valve. The pipe 67 extending from the mixing valve supplies hot wash water to the hot water faucet 68. The general operation of this modified system will be apparent from the foregoing description and the description already given of the operation of the first described form of apparatus.

The modification shown in Fig. 4 embodies a heating apparatus B'' which combines the functions of the heating tank B or B' previously described and the vapor regulator C. This heater B is adapted to supply water to the mixing valve at a substantially predetermined temperature, although this temperature may be so adjusted as to be in excess of that required for use in the wash basin. The heater B' comprises a main casting 69 enclosing a heating chamber 70 into the lower portion of which cold water is forced as required from reservoir A through pipe 12, one-way valve 15 and branch pipe 14, as in the apparatus shown in Fig. 2. The heated water flows from chamber 70 through pipes 16 and 17 to the mixing valve D as in the apparatus already described. A steam chamber 71 is formed in the top of casing 69, the steam inlet pipe 72 communicating with an inlet chamber 73 which is separated from the main steam chamber 71 by a web 74 in which is positioned the removable valve seat 75. The movable member of this steam inlet valve comprises a stem 76 on which is formed the conical valve member 77 adapted to engage valve seat 75, and a collar 78 spaced upwardly from the valve 77. The lower end of stem 76 is formed with a guiding spider 79 adapted to slide in the cylindrical steam passage extending through valve seat 75, and the upper portion of stem 76 slides vertically through a guide member 80 projecting downwardly from closure plug 81 screwed into the upper portion of the casing surrounding steam chamber 71. An operating lever 82 is intermediately pivoted at 83 between ears 84 formed on a closure or cap 85 mounted over opening 86 formed in one side of steam chamber 71. A flexible corrugated sealing diaphragm 87 is secured at one end to closure 85 and at the other end to the lever 82 so as to seal the opening through the wall of chamber 71 without interfering with rocking movements of lever 82. A yoke 88 at the inner end of lever 82 engages between the valve member 77 and collar 78 on the valve stem so that the valve will be raised or lowered as the lever 82 is rocked about its fulcrum 83.

A thermostatic valve-operating mechanism is carried by a plug 89 screwed into the upper wall of casing 69. A hollow housing consisting of tube 90 with a larger cylindrical hollow chamber 91 at its lower end is supported from plug 89. An expansible and contractible corrugated bellows, with a quantity of temperature responsive fluid sealed therein, is housed in chamber 91 and supported upon a rest 93 in the lower end of the chamber.

An operating stem 94 provided with guide projections 95 extends upwardly through tube 90 and is raised or lowered as the bellows 92 expands or contracts due to changes in temperature of the water in the heating chamber 70, in which the thermostat assembly is immersed. An adjusting screw 96 provided with lock nut 97 is mounted in the arm of lever 82, the lower end of the screw bearing on a head 90' at the upper end of stem 94.

When the water in chamber 70 is heated to a predetermined temperature, the thermostatic element 92 will expand and lift the rod 94 thereby rocking lever 82 and lowering the valve 77 against its seat 75 and cutting off further flow of steam into chamber 71. When the water in tank 70 cools, due to radiation or to the removal of heated water from the tank and consequent inflow of cold water, the thermostatic element 92 will contract and rod 94 will be lowered so that the steam pressure in the inlet chamber 73 can raise and open the valve 77 permitting additional steam to flow from the source of supply into chamber 71 and thence into the heating element hereinafter described. The temperature at which the thermostat will function to close valve 77 can be selected by adjusting the position of screw 96 in lever 82.

A heating pipe or conduit 98 extends downwardly through the tank 70 and is anchored at its upper end 99 in the upper wall of casing 69 so as to be in open communication with the steam supply chamber 71. A single rather large heating pipe 98 may be used, as here shown, or this pipe may be coiled or in multiple, the only essential being that sufficient heating surface be provided to quickly and adequately heat the volume of water contained in chamber 70. The lower end of heating pipe 98 extends through and is sealed in the lower wall of the tank, and a telescopic joint is provided at this location to permit relative expansion and contraction between the heating pipe and tank. An inverted cup member 100 is screwed into the lower wall of the housing 69 at 101, and a gland 102 is screwed into cup 100 so as to hold a packing ring 103 in water-tight engagement with the outer surface of pipe 98 for permitting the pipe to slide vertically therethrough. The lower end of inverted cup member 100 is closed by a cap 104 screwed into the cup, and a plug 105 having a central steam passage 106 screwed into the central portion of cap 104. The parts 100 to 105 inclusive, as just described, enclose a stationary outlet chamber forming an extension of the heating pipe 98, which pipe is free to expand downwardly into the chamber. A valve is provided for closing the lower end of passage 106 leading from this outlet chamber. An internally threaded valve guide 107 provided with a plurality of steam outlets 108 in its side portion is screwed onto the lower portion of plug 105, this valve being adapted to support the movable valve member 109 which, when elevated, seats against and closes the lower end of steam passage 106.

An annular wall 110 projecting downwardly from casing 69 encloses a substantially cylindrical exhaust chamber 111 which is closed at its bottom by a removable closure plate 112 into which is threaded the drain pipe 113 which extends downwardly beneath the car to permit condensate and non-condensible gases to be discharged from the heating apparatus. An expansible thermostatic disk 114 is supported and housed within chamber 111. This disk contains a fluid which will expand or contract quickly in response to temperature changes. The disk 114 is supported upon an adjustable rest 115 comprising a screw 116 mounted in a central opening in closure plate 112. The upper face of thermostatic disk 114 bears against the lower end of movable valve member 109, and a plurality of vertically extending guide ribs 117 prevent excessive lateral movements of thermostatic disk 114.

In operation, the tank or chamber 70 is kept continuously filled with water supplied under pressure from reservoir A through pipe 14. Steam will flow in from supply pipe 72 through inlet chamber 73, the valve passage controlled by valve 77 and steam chamber 71 into the heating pipe 98. This steam will be condensed and will give off its heat to the water in chamber 70, the condensate draining out through valve passage 106 and outlet passages 108 into the exhaust chamber 111 and thence out through drain pipe 113. As soon as a material volume of steam can collect in heating pipe 98 without condensing, excess steam will be forced down into exhaust chamber 111 and the thermostatic disk 114 will be heated thereby and will expand so as to lift the valve 109 and close the valve passage 106 thus preventing the further escape of steam from the heating pipe 98. As the steam in chamber 111 condenses, the valve disk 109 will be lowered to permit the escape of accumulated condensate, but the valve will again be quickly closed by the expansion of thermostatic disk 114 when steam again flows into chamber 111. It will be noted that this steam trap mechanism tends to maintain the heating pipe 98 filled with steam, and will permit condensate to drain therefrom with a minimum loss of steam. When the water in tank 70 has been heated to the desired temperature, the thermostat 92 will function as hereinabove described, to close the inlet valve 77 and cut off the further supply of steam to chamber 71 and heating pipe 98. As soon as the temperature of the water in tank 70 has sufficiently fallen (either by removal of hot water therefrom or by radiation) the expansive fluid in thermostat 92 will contract so as to permit the valve 77 to open and admit further steam into the heating element.

It will be apparent that this heating mechanism B'' will function to maintain a supply of hot water at a substantially constant and predetermined temperature. The hot water is delivered through pipes 16 and 17 to the mixing valve D, and the remainder of the system functions in the same manner as the system first described and disclosed in Fig. 2.

It will now be apparent that in all of these systems the mixing valve D functions to provide hot water at the discharge faucet or other place of usage at a substantially predetermined temperature, or at least not materially in excess of a predetermined maximum, while a considerable range of temperature is permitted in the hot water supply provided by the heating apparatus. This not only prevents injury to the user of the hot wash water, but permits the use of a smaller heating device operating at higher temperatures than would be the case if the mixing valve were not provided.

We claim:

1. In an apparatus for supplying hot wash water in a railway car, a heating tank, a mixing valve, means for supplying cold water to the tank and to the mixing valve respectively, a pipe for conducting hot water from the tank to the mixing valve, said mixing valve comprising inlet ports with which the hot and cold water pipes respectively communicate and an outlet port for the hot wash water, valves for controlling the inlet ports, a thermostatic element for operating the valves, the heating tank comprising a heating element positioned within the tank, and means for supplying heating medium to this heating element.

2. In an apparatus for supplying hot wash water in a railway car, a heating tank, a mixing valve, means for supplying cold water to the tank and to the mixing valve respectively, a pipe for conducting hot water from the tank to the mixing valve, said mixing valve comprising inlet ports with which the hot and cold water pipes respectively communicate and an outlet port for the hot wash water, valves for controlling the inlet ports, a thermostatic element for operating the valves, the heating tank comprising a steam conduit positioned within the tank, a vapor regulator, a steam supply pipe leading to the vapor regulator, and pipe connections between the vapor regulator and heating conduit for delivering vapor to the conduit and discharging condensate therefrom.

3. In an apparatus for supplying hot wash water in a railway car, a heating tank, a mixing valve, means for supplying cold water to the tank and to the mixing valve respectively, a pipe for conducting hot water from the tank to the mixing valve, said mixing valve comprising inlet ports with which the hot and cold water pipes respectively communicate and an outlet port for the hot wash water, valves for controlling the inlet ports, a thermostatic element for operating the valves, the heating tank comprising a steam conduit positioned within the tank, a steam trap for discharging condensate therefrom, a steam supply pipe leading to the conduit, a valve for controlling communication between the supply pipe and conduit, and a thermostatic element in the tank for opening and closing the valve.

4. Apparatus for supplying cold water and hot water at a predetermined temperature to a railway car washing system, comprising a water reservoir, a heating tank, a mixing valve comprising separate inlet ports for hot and cold water and an outlet port for the hot wash water, valves for controlling the inlet ports and a thermostatic element for controling the valves, a hot wash water supply pipe leading from the outlet port to the washing system, a cold water pipe leading from the reservoir to the car washing system and having branches leading respectively to the heating tank and to the mixing valve, a hot water pipe leading from the heating tank to the mixing valve, a steam conduit within the heating tank, and means for supplying steam to the conduit and controlling the flow of steam therethrough.

5. Apparatus for supplying cold water and hot water at a predetermined temperature to a railway car washing system, comprising a water reservoir, a heating tank, a mixing valve comprising separate inlet ports for hot and cold water and an outlet port for the hot wash water, valves for controlling the inlet ports and a thermosatic element for controlling the valves, a hot wash water supply pipe leading from the outlet port to the washing system, a cold water pipe leading from the reservoir to the car washing system and having branches leading respectively to the heating tank and to the mixing valve, a hot water pipe leading from the heating tank to the mixing valve, a branch conduit connecting said hot water pipe with the reservoir, a normally closed pressure controlled valve in this branch conduit, and means for heating the water in the heating tank.

6. Apparatus for supplying cold water and hot water at a predetermined temperature to a railway car washing system, comprising a water reservoir, a heating tank, a mixing valve comprising separate inlet ports for hot and cold water and an outlet port for the hot wash water, valves for controlling the inlet ports and a thermostatic element for controlling the valves, a hot wash water supply pipe leading from the outlet port to the washing system, a cold water pipe leading from the reservoir to the car washing system and having branches leading respectively to the heating tank and to the mixing valve, a hot water pipe leading from the heating tank to the mixing valve, a branch conduit connecting said hot water pipe with the reservoir, a normally closed pressure controlled valve in this branch conduit, a steam conduit within the heating tank, and means for supplying steam to the conduit and controlling the flow of steam therethrough.

EDWARD A. RUSSELL.
PAUL B. PARKS.
WILLIAM M. SMITH.